(12) United States Patent
Ghosh et al.

(10) Patent No.: US 11,792,004 B2
(45) Date of Patent: Oct. 17, 2023

(54) POLYNOMIAL MULTIPLICATION FOR SIDE-CHANNEL PROTECTION IN CRYPTOGRAPHY

(71) Applicant: Intel Corporation, Santa Clara, CA (US)

(72) Inventors: Santosh Ghosh, Hillsboro, OR (US); Manoj Sastry, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 17/478,579

(22) Filed: Sep. 17, 2021

(65) Prior Publication Data

US 2023/0091951 A1    Mar. 23, 2023

(51) Int. Cl.
*H04L 9/30* (2006.01)
*G06F 7/487* (2006.01)
*G06F 7/53* (2006.01)
*H04L 9/08* (2006.01)

(52) U.S. Cl.
CPC .......... *H04L 9/3026* (2013.01); *G06F 7/4876* (2013.01); *G06F 7/53* (2013.01); *H04L 9/0869* (2013.01); *H04L 9/3093* (2013.01)

(58) Field of Classification Search
None
See application file for complete search history.

(56) References Cited

U.S. PATENT DOCUMENTS

| | | | | |
|---|---|---|---|---|
| 2003/0215093 A1* | 11/2003 | Ding | .................... | H04L 9/3093 380/255 |
| 2019/0312728 A1* | 10/2019 | Poeppelmann | ........ | H04L 9/3093 |
| 2020/0153618 A1* | 5/2020 | Bhattacharya | ........ | H04L 9/0841 |
| 2021/0099290 A1* | 4/2021 | Tomlinson | ................ | H04L 9/14 |
| 2021/0279040 A1* | 9/2021 | Yonemura | ............... | G06F 7/725 |
| 2022/0029824 A1* | 1/2022 | Poeppelmann | ........ | H04L 9/3218 |
| 2022/0286286 A1* | 9/2022 | Renes | ..................... | G06F 7/722 |
| 2022/0337389 A1* | 10/2022 | Gourjon | .................. | H04L 9/002 |

* cited by examiner

*Primary Examiner* — Trang T Doan
(74) *Attorney, Agent, or Firm* — JAFFERY WATSON MENDONSA & HAMILTON LLP (57) ABSTRACT

Polynomial multiplication for side-channel protection in cryptography is described. An example of an apparatus includes one or more processors to process data; a memory to store data; and polynomial multiplier circuitry to multiply a first polynomial by a second polynomial, the first polynomial and the second polynomial each including a plurality of coefficients, the polynomial multiplier circuitry including a set of multiplier circuitry, wherein the polynomial multiplier circuitry is to select a first coefficient of the first polynomial for processing, and multiply the first coefficient of the first polynomial by all of the plurality of coefficients of the second polynomial in parallel using the set of multiplier circuits.

19 Claims, 6 Drawing Sheets

POLYNOMIAL MULTIPLICATION FOR SIDE-CHANNEL PROTECTION IN CRYPTOGRAPHY

TECHNICAL FIELD

Embodiments described herein generally relate to the field of electronic devices and, more particularly, efficient side-channel robust polynomial multiplication for cryptography.

BACKGROUND

In modern cryptographic operations, key encapsulation mechanisms (KEMs) are encryption techniques to secure symmetric cryptographic key material for transmission. Such mechanisms utilize asymmetric (public key) algorithms in which difficult mathematical problems are implemented in calculation to protect against attack. Such methods provide strong protection against conventional computation because, even if data from calculations can be determined, the resulting mathematical problem cannot be practically solved.

However, quantum computing is expected to enable attackers to solve problems that were previously impractical to attempt, including the solving of cryptographic mathematics in KEMs. Attacks may utilize side-channels to obtain signals from cryptographic computation, and apply quantum computing to determine secret values. As a result, any existing cryptographic methods may potentially be broken.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are directed to efficient side-channel robust polynomial multiplication for cryptography.

Public key cryptography, also referred to as asymmetric cryptography, is in general a cryptographic system that uses pairs of keys in encryption, the pairs including public keys that may be publicly known and private keys (secret keys) that are securely maintained and only known by the key owner. The key pairs are generated utilizing cryptographic algorithms which are based on difficult mathematical problems.

It is expected that classical public-key cryptography like, such as Elliptic Curve Cryptography (ECC), Elliptic Curve Digital Signature Algorithm (ECDSA), Diffie-Hellman (DH), Rivest Shamir Adleman (RSA), Digital Signature Algorithm (DSA), will be broken by quantum computers, referring to computers that exploit properties of quantum states to perform computation. Further, adversaries may be currently mining data from cryptographic operations now to implement when sufficient quantum computing technology is available.

For this reason, Post-Quantum Cryptography Standardization is a program and competition by the National Institute of Standards and Technology (NIST) to update their standards to include post-quantum cryptography. However, there is a pressing need to develop post quantum secure key encapsulation mechanisms (KEM) solutions as soon as possible.

In lattice KEMs for cryptographic operations, one secret polynomial is multiplied with another public polynomial. The multiplication consists of sequentially multiplying each coefficient of the secret polynomial with a respective element of the public polynomial. The polynomials may be degree-256 polynomials. Multiplications between two such polynomials are the main compute intensive operation for cryptographic key-generation, encapsulation, and decapsulation.

In KEM operations, a multiplier may leak the private key through power or electromagnetic (EM) (or other) side-channels. While side-channel protection techniques (such as masking) may be implemented to reduce the likelihood of side-channel detection, the protections require significant hardware overhead for devices and systems, such as potentially 2× to 6× silicon-area overhead to provide the necessary protection.

In an intended attack, an attacker can choose the public polynomial and measure the available side-channels, which may include the power and electro-magnetic emissions from a circuit or device. The attacker can then correlate the side-channels with the secret coefficients one at a time utilizing future quantum computer processing. The attack complexity increases exponentially based on the number of target coefficients. By attacking one coefficient at a time, the complexity is $256 \times 2^d$, where d is the bit length of a coefficient. Such complexity will be vulnerable to post quantum attack.

In some embodiments, an apparatus, system, or process is to process all secret polynomial coefficients in parallel in every cycle in order to break the correlation between side-channel measurements and the secret values. In this manner, the noise in any side-channel is magnified through the required calculations, thus greatly increasing the difficulty of correlating the side-channel signals with the secret values.

In some embodiments, to provide additional side-channel protection, multiple (n) of public polynomial coefficients are multiplied in parallel with all secret coefficients. The additional multiple thus will act to further increase the noise in any side-channel, thus increasing the difficulty of presenting a successful side-channel attack.

In this manner, post quantum side-channel attacks should not be practical due to the significant correlated-noise generated by processing secret values in parallel. Identifying all 256 secret coefficients of a degree-256 polynomials at one time is thus made infeasible because the calculation then has a $O(2^{256 \times d})$ complexity, where each coefficient is d bits.

In some embodiments, an apparatus, system, or process provides multiplication and modulus reduction in a same cycle, thus allowing for sufficient performance in processing. The resulting design is latency efficient, requiring 256/n cycles vs 256×256 cycles in the traditional case in which the multiplications are performed sequentially.

Figure 1:
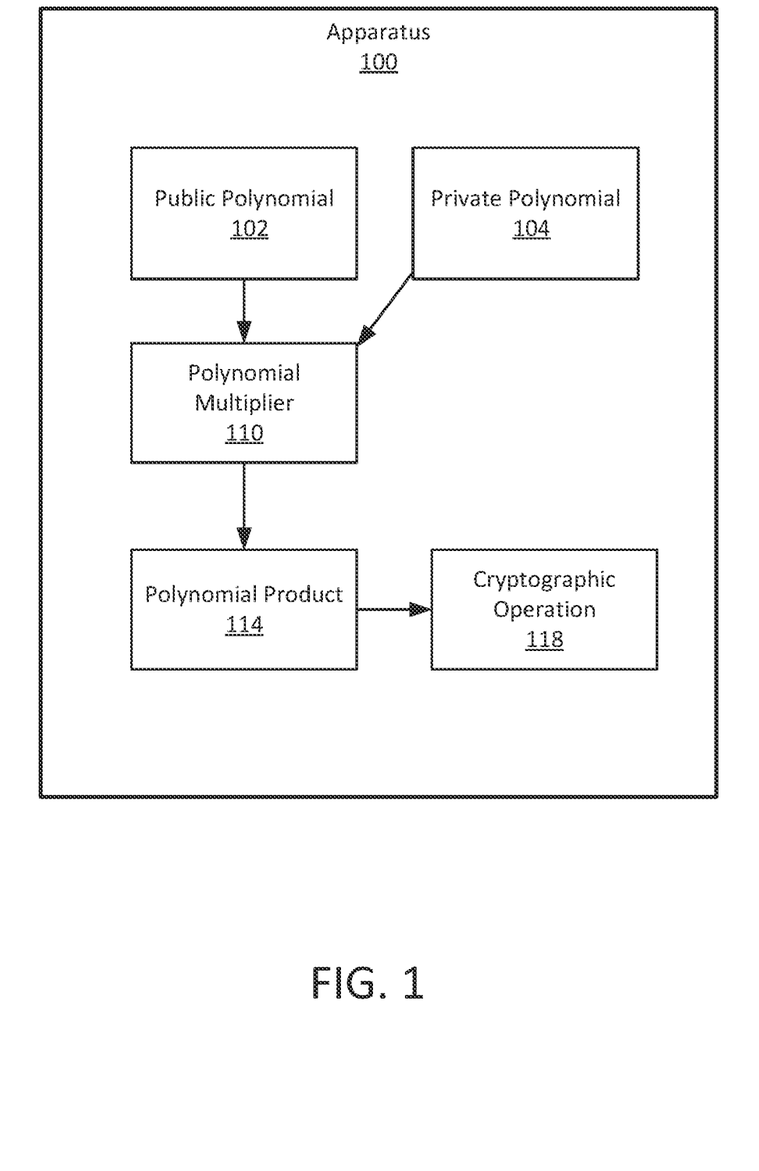
FIG. 1 illustrates an apparatus or system including polynomial multiplication for a cryptographic key operation, according to some embodiments.

FIG. 1 illustrates an apparatus or system including polynomial multiplication for a cryptographic key operation, according to some embodiments. As shown in FIG. 1, an apparatus or system, such as the illustrated apparatus 100, is to provide for a cryptographic key operation providing side-channel protection. In some embodiments, the cryptographic key operation is a lattice KEM cryptographic operation, in which a public polynomial 102 is multiplied with a private polynomial 104. In one example, the public polynomial 102 and private polynomial 104 are each degree-256 polynomial, with each coefficient having n bits, n being an integer.

In some embodiments, the public polynomial 102 and private polynomial 104 are multiplied by polynomial multiplier circuitry (also referred to herein as a polynomial multiplier) 110, wherein the polynomial multiplier 110 provides for simultaneous multiplication of one or more coefficients of the public polynomial 102 with all (or a large number of) coefficients of the private polynomial 104 in order to provide protection against side-channel attacks on the apparatus 100. In some embodiments, the resulting polynomial product is then applied in a cryptographic operation 118, which may include cryptographic key generation, encapsulation, or de-encapsulation.

Figure 2:
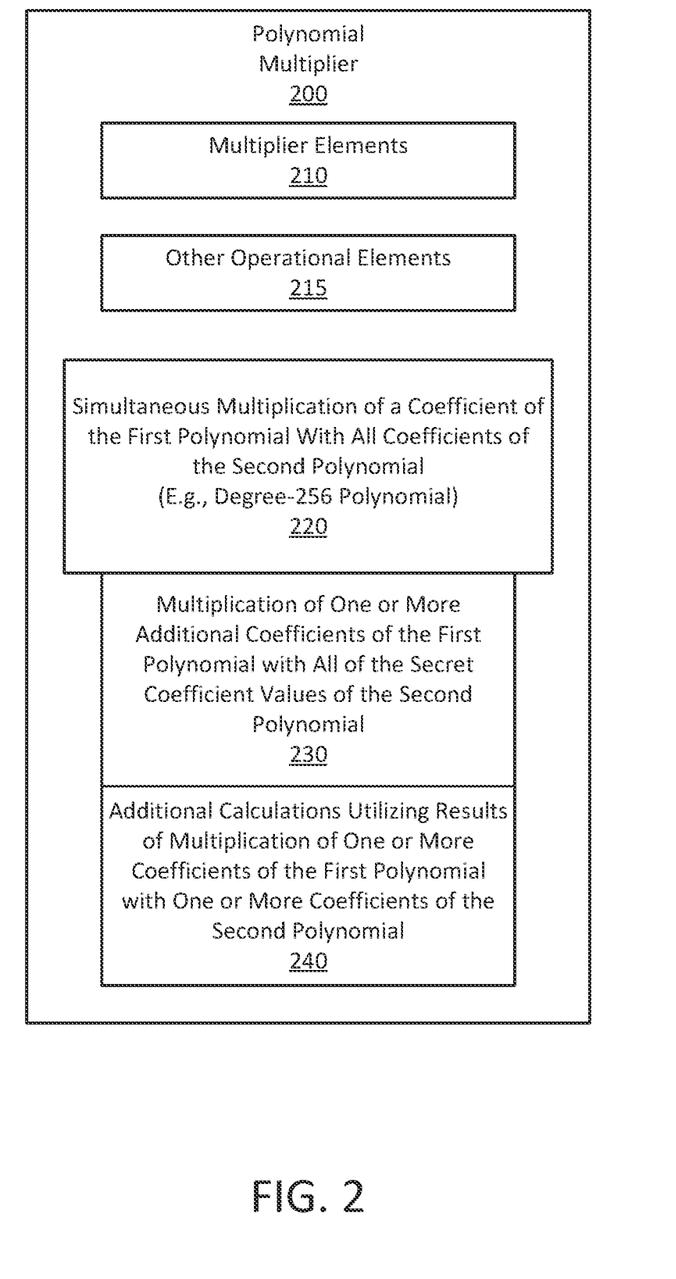
FIG. 2 illustrates a polynomial multiplier for a cryptographic key operation, according to some embodiments.

FIG. 2 illustrates a polynomial multiplier for a secure key operation, according to some embodiments. As illustrated in FIG. 2, a polynomial multiplier 200 including one or more sets of multipliers (multiplier circuits or units) 210, such as the polynomial multiplier 110 of apparatus 100 illustrated in FIG. 1, provides for the multiplication of a first polynomial with a second polynomial, wherein the first polynomial may be a public polynomial and the second polynomial may be a private polynomial, such as in a lattice KEM cryptographic operation. The multiplication may include post quantum cryptographic operation. The polynomial multiplier 200 may include one or more sets of other operational circuit elements, such as, for example, the sets of adder circuits (also referred to herein as adders) 450 and 455 illustrated in FIG. 4, utilized in the multiplication operation and side-channel protection.

In some embodiments, to provide security against side-channel attack, including power and EM signal detection, the polynomial multiplier circuitry includes side-channel protection to prevent or minimize the likelihood of correlation of private values through detected leakage of side-channel information. In some embodiments, the side-channel protection includes simultaneous multiplication of a coefficient (a first coefficient) of the first polynomial with all (or a large number of) coefficients of the second polynomial 220, thereby generating noise in calculation to prevent correlation of the values of the second polynomial. In some embodiments, the multiplication includes multiplication and modulus reduction in a single clock cycle. For example, the polynomial multiplier 200 may include the multiplier 300 illustrated in FIG. 3.

In some embodiments, to provide further security against side-channel attack, the side-channel protection provided by the polynomial multiplier circuitry further includes simultaneous multiplication of one or more additional coefficients of the first polynomial (such as a second coefficient) with all coefficients of the second polynomial 230, thereby providing additional noise to prevent correlation of the values of the second polynomial. For example, the polynomial multiplier 200 may include the multiplier 400 illustrated in FIG. 4.

In some embodiments, the polynomial multiplier 200 may include one or more additional calculations utilizing results of multiplication of one or more coefficients of the first polynomial with one or more coefficients of the second polynomial 240. For example, each result of multiplication of a first coefficient of the first polynomial with one of the plurality of coefficients of the second polynomial may be added (utilizing a set of adders) to each result of multiplication of a second coefficient of the first polynomial with a another of the plurality of coefficients of the second polynomial. For example, other operational elements 215 of the polynomial multiplier 200 may include the adder circuits (450 and 455) of multiplier 400 illustrated in FIG. 4.

Figure 3:
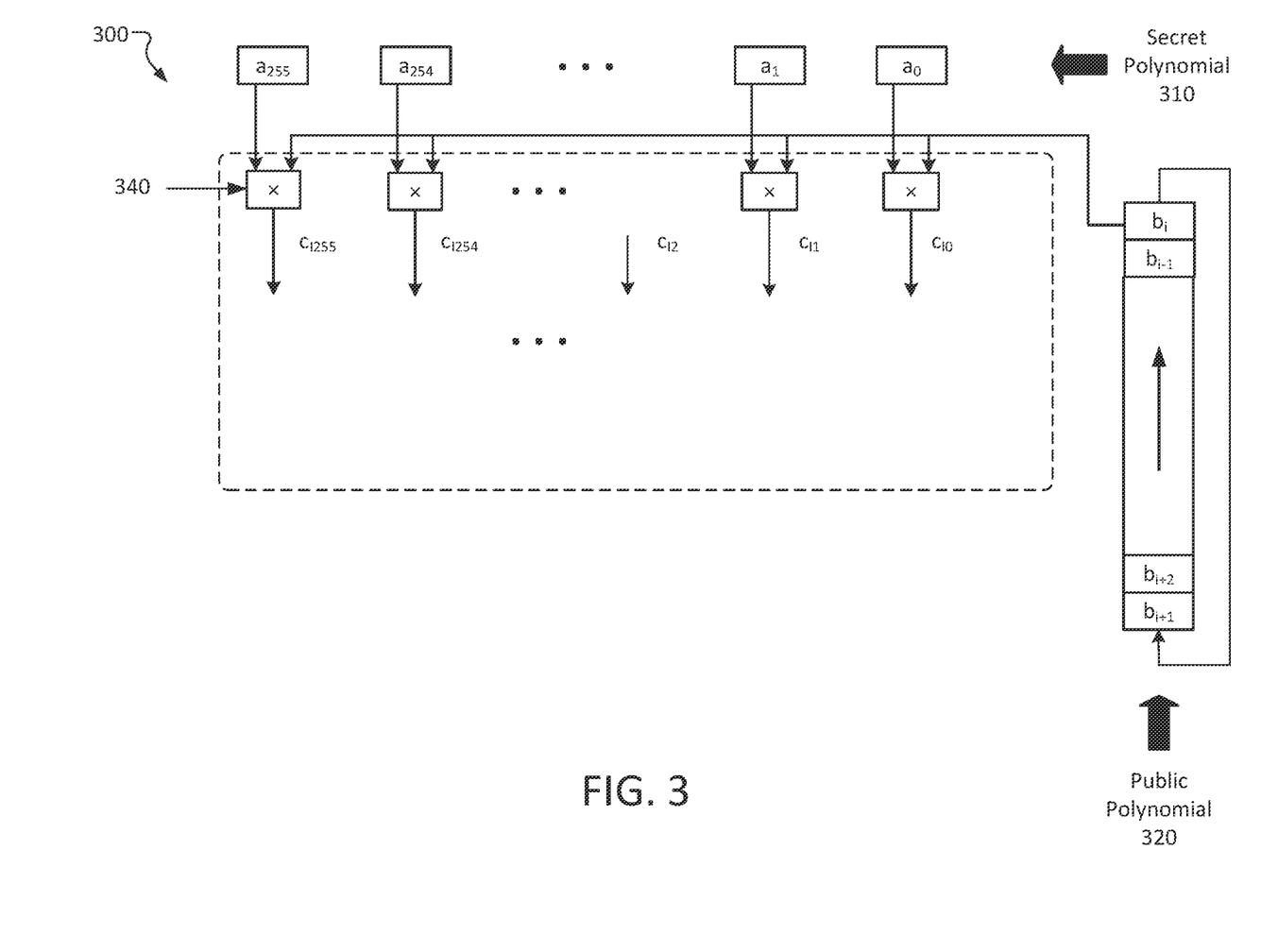
FIG. 3 illustrates an example of a polynomial multiplier for a cryptographic key operation providing for parallel processing of a public polynomial coefficient with all coefficients of a secret polynomial, according to some embodiments.

FIG. 3 illustrates an example of a polynomial multiplier for a cryptographic key operation providing for parallel processing of a public polynomial coefficient with all coefficients of a secret polynomial, according to some embodiments. In some embodiments, polynomial multiplier circuitry 300 provides of multiplication of each coefficient of a public polynomial 320 with all of the coefficients of a secret polynomial 310 in a modulus multiplication ab mod q. Each coefficient may be a d-bit value. The polynomial multipliers illustrated in FIGS. 3 and 4 may include multipliers in an apparatus or system to provide protection from post quantum side-channel attacks.

As illustrated in FIG. 3, the coefficients of the public polynomial 320, indicated as current coefficient values b, are iteratively provided to the polynomial multiplier circuitry 300 in a multiplication operation. For example, a $b_i$ value is multiplied at a current time, followed in the operation by $b_{i-1}$. In such illustration, the operation may have previously processing coefficient values $b_{i+1}$ and $b_{i+2}$. In a particular implementation there are 256 coefficients in 256×256 polynomial multiplication, but embodiments are not limited to a particular polynomial structure.

In some embodiments, each such coefficient value of the public polynomial 320 is multiplied in parallel by all of the coefficient values of the secret polynomial 310. As illustrated, the coefficient values of the secret polynomial are each received or stored in registers by the polynomial multiplier 300, the coefficient values being $a_0$ through $a_{255}$, and are multiplied by the current $b_i$ value by a set of multiplier circuits (multipliers) 340 to generate the set of products $c_{i0}$ through $c_{i255}$ (256 product values). The set of multipliers 340 includes a number of multipliers equal to the degree of the polynomials, or 256 multipliers in the illustrated example. In some embodiments, the polynomial multiplier 300 provides for multiplication and modulus reduction for each coefficient $b_i$ of the public polynomial in a single clock cycle.

Figure 4:
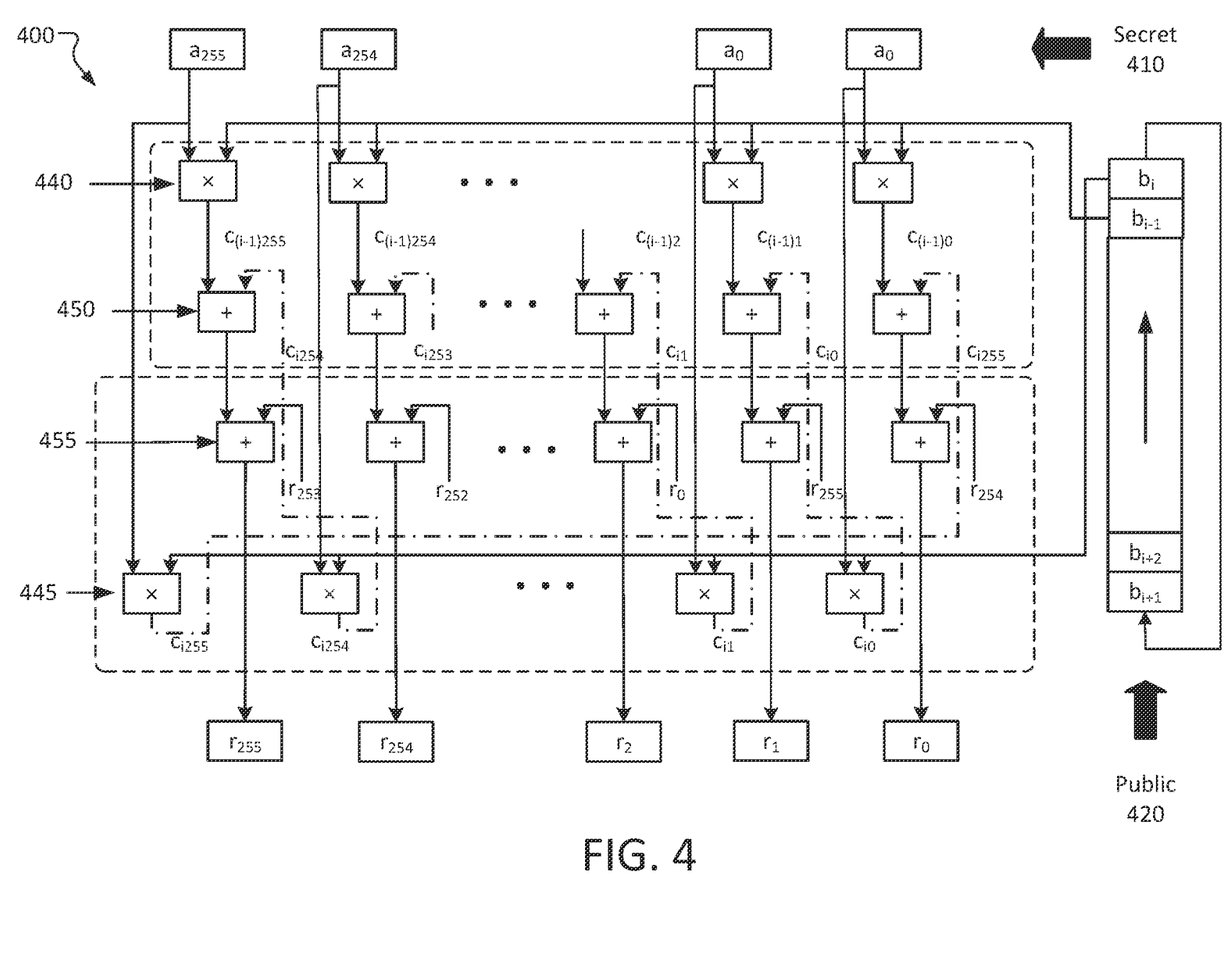
FIG. 4 illustrates an example of a polynomial multiplier for a cryptographic key operation providing for parallel processing of multiple public polynomial coefficients with all coefficients of a secret polynomial, according to some embodiments.

FIG. 4 illustrates an example of a polynomial multiplier for a cryptographic key operation providing for parallel processing of multiple public polynomial coefficients with all coefficients of a secret polynomial, according to some embodiments. In some embodiments, polynomial multiplier circuitry 400 provides of multiplication of multiple coefficients of a public polynomial 420 with all of the coefficients of a secret polynomial 410 in a modulus multiplication ab mod q.

As illustrated in FIG. 4, the coefficients of the public polynomial 420, indicated as current coefficient values b, are iteratively provided in sets of multiple values to the multiplier 400 in a multiplication operation. In the illustrated example, two coefficients of the public polynomial are processed in one iteration. For example, a $b_i$ value and a $b_{i-1}$ value are multiplied at a current time, followed in the operation by a next two b coefficient values. In such illustration, the operation may have previously processed together coefficient values $b_{i+1}$ and $b_{i+2}$. In a particular implementation there are 256 coefficients in 256×256 polynomial multiplication.

In some embodiments, each such coefficient value of the public polynomial 420 is multiplied in parallel by all of the coefficient values of the secret polynomial 410. As illustrated, the coefficient values of the secret polynomial 410 are each received or stored in registers by the polynomial multiplier 400, the coefficient values being $a_0$ through $a_{255}$, and are multiplied by the current set of values by multiple sets of multipliers. In this example, a first set of multipliers 440 processes the multiplication of the $b_{i-1}$ coefficient value by all of the coefficient values $a_0$-$a_{255}$ to generate the set of products $c_{(i-1)0}$ through $c_{(i-1)255}$ (256 product values), and a second set of multipliers 445 processes the multiplication of the $b_i$ coefficient value by all of the coefficient values $a_0$-$a_{255}$ to generate the set of products $c_{i0}$ through $c_{i255}$ (256 product values). Each set of multipliers 440 and 445 includes a number of multipliers equal to the degree of the polynomials, or 256 multipliers in the illustrated example. In some embodiments, the polynomial multiplier 400 provides for multiplication and modulus reduction for each coefficient $b_i$ and $b_{i-1}$ of the public polynomial in a single clock cycle.

In some embodiments, additional operations based upon the calculations of the polynomial multiplier 400 may be performed to further protect the secret coefficient values from side-channel attack. As the operation of the polynomial multiplier 400 is illustrated in FIG. 4, the values generated by each the multipliers are further added to another product value to generate additional compute noise. In the particular implementation shown in FIG. 4, the polynomial multiplier 400 includes a first set of adder circuits (adders) 450 to add $c_{(i-1)255}$ to $c_{i254}$, $c_{(i-1)254}$ to $c_{i253}$, and continuing to add $c_{(i-1)0}$ to $c_{i255}$.

Further, the first sum from such addition may be further added to a second sum of another coefficient addition operation by a second set of adders 455. For example, the first sum of $c_{(i-1)255}$ to $c_{i254}$ is added to sum $r_{253}$, and continuing through each of the coefficient multiplications, further adding to the computational noise to prevent correlation of the secret coefficient values.

Figure 5:
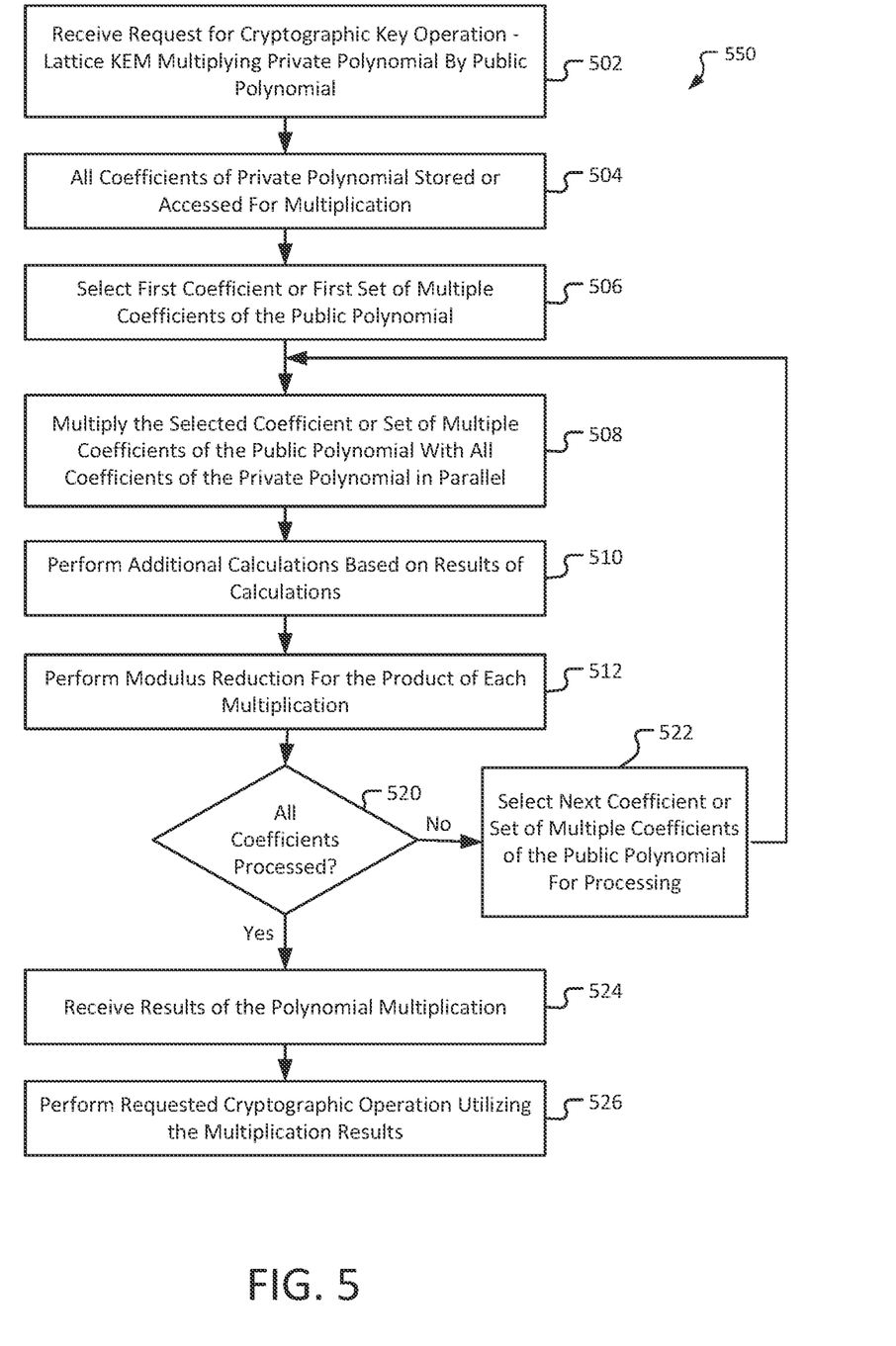
FIG. 5 is flowchart to illustrate a process for polynomial multiplication for a cryptographic key operation to provide side-channel protection, according to some embodiments.

FIG. 5 is flowchart to illustrate a process for polynomial multiplication for a cryptographic key operation to provide side-channel protection, according to some embodiments. In a process 500 (wherein the process may include, for example, a method or instruction stored in a storage medium for performance by one or more processors), a request may be received for performance of a cryptographic key operation 502, such as cryptographic key generation, encapsulation, or de-encapsulation. In some embodiments, the performance of the cryptographic key operation includes a lattice KEM process, which may include multiplication of a secret polynomial by a public polynomial.

In some embodiments, the process 500 includes all of the coefficients of the secret polynomial being stored or accessed for multiplication 504. For example, each of the 256 coefficients of a degree-256 secret polynomial may be stored in in a separate location for access. In some embodiments, a first coefficient or a first set of multiple (2 or more) coefficients are selected 506.

The process 500 continues with multiplying the selected coefficient or set of coefficients in parallel with all of the coefficients of the private polynomial 508. In some implementations, the process 500 may further include performing one or more additional sets of calculations using the products of such multiplications 510, such as the addition of results together, to provide further computational noise to support side-channel protection. Modulus reduction may then be performed for the product of each multiplication between the coefficients of the private polynomial and the public polynomial 512.

A determination is then made whether all coefficients of the private and public polynomials have been processed 520. If not, then a next coefficient or set of multiple coefficients of the public polynomial are selected for processing 522, and the processing continues with multiplying the selected coefficient or set of coefficients in parallel with all of the coefficients of the private polynomial 508.

If all coefficients of the private and public polynomials have been processed 520, then the results of the polynomial multiplication are received 524, and the requested cryptographic key operation is performed utilizing such multiplication results 526.

Figure 6:
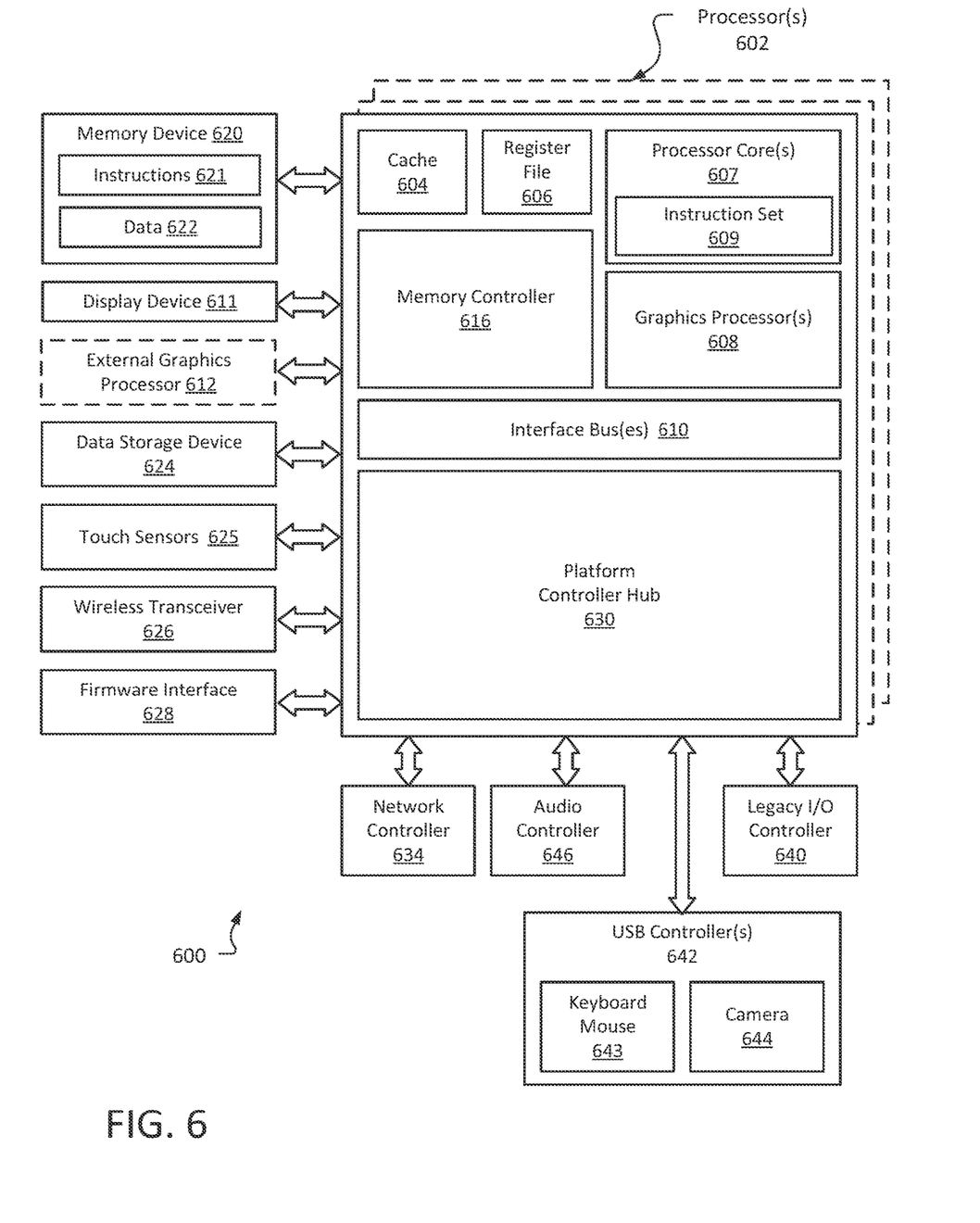
FIG. 6 illustrates an embodiment of an exemplary computing architecture for performance of polynomial multiplication for a cryptographic key operation, according to some embodiments.

FIG. 6 illustrates an embodiment of an exemplary computing architecture for performance of polynomial multiplication for a cryptographic key operation, according to some embodiments. In various embodiments as described above, a computing architecture 600 may comprise or be implemented as part of an electronic device. In some embodiments, the computing architecture 600 may be representative, for example, of a computer system that implements one or more components of the operating environments described above. The computing architecture 600 may be utilized to provide polynomial multiplication for a cryptographic key operation, such as described in FIGS. 1-5.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections.

Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 includes one or more processors 602 and one or more graphics processors 608, and may be a single processor desktop system, a multiprocessor workstation system, or a server system having a large number of processors 602 or processor cores 607. In one embodiment, the system 600 is a processing platform incorporated within a system-on-a-chip (SoC or SOC) integrated circuit for use in mobile, handheld, or embedded devices.

An embodiment of system 600 can include, or be incorporated within, a server-based gaming platform, a game console, including a game and media console, a mobile gaming console, a handheld game console, or an online game console. In some embodiments system 600 is a mobile phone, smart phone, tablet computing device or mobile Internet device. Data processing system 600 can also include, couple with, or be integrated within a wearable device, such as a smart watch wearable device, smart eyewear device, augmented reality device, or virtual reality device. In some embodiments, data processing system 600 is a television or set top box device having one or more processors 602 and a graphical interface generated by one or more graphics processors 608.

In some embodiments, the one or more processors 602 each include one or more processor cores 607 to process instructions which, when executed, perform operations for system and user software. In some embodiments, each of the one or more processor cores 607 is configured to process a specific instruction set 609. In some embodiments, instruction set 609 may facilitate Complex Instruction Set Computing (CISC), Reduced Instruction Set Computing (RISC), or computing via a Very Long Instruction Word (VLIW). Multiple processor cores 607 may each process a different instruction set 609, which may include instructions to facilitate the emulation of other instruction sets. Processor core 607 may also include other processing devices, such a Digital Signal Processor (DSP).

In some embodiments, the processor 602 includes cache memory 604. Depending on the architecture, the processor 602 can have a single internal cache or multiple levels of internal cache. In some embodiments, the cache memory 604 is shared among various components of the processor 602. In some embodiments, the processor 602 also uses an external cache (e.g., a Level-3 (L3) cache or Last Level Cache (LLC)) (not shown), which may be shared among processor cores 607 using known cache coherency techniques. A register file 606 is additionally included in processor 602 which may include different types of registers for storing different types of data (e.g., integer registers, floating point registers, status registers, and an instruction pointer register). Some registers may be general-purpose registers, while other registers may be specific to the design of the processor 602.

In some embodiments, one or more processor(s) 602 are coupled with one or more interface bus(es) 610 to transmit communication signals such as address, data, or control signals between processor 602 and other components in the system. The interface bus 610, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 602 include an integrated memory controller 616 and a platform controller hub 630. The memory controller 616 facilitates communication between a memory device and other components of the system 600, while the platform controller hub (PCH) 630 provides connections to I/O devices via a local I/O bus.

Memory device 620 can be a dynamic random-access memory (DRAM) device, a static random-access memory (SRAM) device, non-volatile memory device such as flash memory device or phase-change memory device, or some other memory device having suitable performance to serve as process memory. Memory device 620 may further include non-volatile memory elements for storage of firmware. In one embodiment the memory device 620 can operate as system memory for the system 600, to store data 622 and instructions 621 for use when the one or more processors 602 execute an application or process. Memory controller hub 616 also couples with an optional external graphics processor 612, which may communicate with the one or more graphics processors 608 in processors 602 to perform graphics and media operations. In some embodiments a display device 611 can connect to the processor(s) 602. The display device 611 can be one or more of an internal display device, as in a mobile electronic device or a laptop device, or an external display device attached via a display interface (e.g., DisplayPort, etc.). In one embodiment the display device 611 can be a head mounted display (HMD) such as a stereoscopic display device for use in virtual reality (VR) applications or augmented reality (AR) applications.

In some embodiments the platform controller hub 630 enables peripherals to connect to memory device 620 and processor 602 via a high-speed I/O bus. The I/O peripherals include, but are not limited to, an audio controller 646, a network controller 634, a firmware interface 628, a wireless transceiver 626, touch sensors 625, a data storage device 624 (e.g., hard disk drive, flash memory, etc.). The data storage device 624 can connect via a storage interface (e.g., SATA) or via a peripheral bus, such as a Peripheral Component Interconnect bus (e.g., PCI, PCI Express). The touch sensors 625 can include touch screen sensors, pressure sensors, or fingerprint sensors. The wireless transceiver 626 can be a Wi-Fi transceiver, a Bluetooth transceiver, or a mobile network transceiver such as a 3G, 4G, Long Term Evolution (LTE), or 5G transceiver. The firmware interface 628 enables communication with system firmware, and can be, for example, a unified extensible firmware interface (UEFI). The network controller 634 can enable a network connection to a wired network. In some embodiments, a high-performance network controller (not shown) couples with the interface bus 610. The audio controller 646, in one embodiment, is a multi-channel high definition audio controller. In one embodiment the system 600 includes an optional legacy I/O controller 640 for coupling legacy (e.g., Personal System 2 (PS/2)) devices to the system. The platform controller hub 630 can also connect to one or more Universal Serial Bus (USB) controllers 642 connect input devices, such as keyboard and mouse 643 combinations, a camera 644, or other USB input devices.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

The following Examples pertain to certain embodiments:

In Example 1, an apparatus includes one or more processors to process data; and polynomial multiplier circuitry to multiply a first polynomial by a second polynomial, the first polynomial and the second polynomial each including a plurality of coefficients, the polynomial multiplier circuitry including a set of multiplier circuits, wherein the polynomial multiplier circuitry is to: select a first coefficient of the first polynomial for processing; and multiply the first coefficient of the first polynomial by all of the plurality of coefficients of the second polynomial in parallel using the set of multiplier circuits.

In Example 2, the polynomial multiplier circuitry is to iteratively multiply each of the plurality of coefficients of the first polynomial with all of the plurality of coefficients of the second polynomial in parallel using the set of multiplier circuits.

In Example 3, the first polynomial is a public polynomial and the second polynomial is a private polynomial.

In Example 4, the apparatus is to perform a cryptographic key operation based base at least in part on multiplication of the first polynomial by the second polynomial.

In Example 5, the multiplication of the first polynomial by a second polynomial is a part of a lattice key encapsulation mechanism (KEM) operation.

In Example 6, the polynomial multiplier circuitry is further to perform a modulus reduction of a product of each multiplication of the first coefficient of the first polynomial by all of the plurality of coefficients of the second polynomial, and wherein the modulus reduction is to be performed in a same clock cycle as each multiplication.

In Example 7, the polynomial multiplier circuitry includes a second set of multiplier circuits, and wherein the wherein the polynomial multiplier circuitry is further to: select a second coefficient of the first polynomial for processing together with the first coefficient of the first polynomial; and multiply the second coefficient of the first polynomial by all of the plurality of coefficients of the second polynomial in parallel using the set of multiplier circuits, multiplication of the second coefficient of the first polynomial being performed in parallel with multiplication of the first coefficient of the first polynomial.

In Example 8, the polynomial multiplier circuitry includes one or more sets of adder circuits, and wherein the polynomial multiplier circuitry is further to: perform one or more additions using products of one or both of multiplication of the first coefficient of the first polynomial by all of the plurality of coefficients of the second polynomial and multiplication of the second coefficient of the first polynomial by all of the plurality of coefficients of the second polynomial.

In Example 9, one or more non-transitory computer-readable storage mediums having stored thereon executable computer program instructions that, when executed by one or more processors, cause the one or more processors to perform operations comprising: receiving a request for a cryptographic key operation, the operation including multiplication of a first polynomial by a second polynomial, the first polynomial and the second polynomial each including a plurality of coefficients; selecting a first coefficient of the first polynomial for processing; multiplying the first coefficient of the first polynomial by all of the plurality of coefficients of the second polynomial in parallel; and performing the cryptographic key operation based at least in part on results of multiplication of the first polynomial by the second polynomial.

In Example 10, the instructions further include instructions for iteratively multiplying each of the plurality of coefficients of the first polynomial with all of the plurality of coefficients of the second polynomial in parallel.

In Example 11, the first polynomial is a public polynomial and the second polynomial is a private polynomial.

In Example 12, multiplication of the first polynomial by the second polynomial is a part of a lattice key encapsulation mechanism (KEM) operation.

In Example 13, the instructions further include instructions for performing a modulus reduction of a product of each multiplication of the first coefficient of the first polynomial by all of the plurality of coefficients of the second polynomial, wherein the modulus reduction is to be performed in a same clock cycle as each multiplication.

In Example 14, the instructions further include instructions for selecting a second coefficient of the first polynomial for processing together with the first coefficient of the first polynomial; and multiplying the second coefficient of the first polynomial by all of the plurality of coefficients of the second polynomial in parallel, multiplication of the second coefficient of the first polynomial being performed in parallel with multiplication of the first coefficient of the first polynomial.

In Example 15, the instructions further include instructions for performing one or more additions using products of one or both of multiplication of the first coefficient of the first polynomial by all of the plurality of coefficients of the second polynomial and multiplication of the second coefficient of the first polynomial by all of the plurality of coefficients of the second polynomial.

In Example 16, a method includes receiving a request for a cryptographic key operation in a computing system, the operation including multiplication of a public polynomial by a private polynomial, and wherein the public polynomial and the private polynomial each include a plurality of coefficients; providing side-channel protection for the cryptographic key operation in the computing system, including multiplying the public polynomial by the private polynomial, including selecting a first coefficient of the public polynomial for processing, and multiplying the first coefficient of the public polynomial by all of the plurality of coefficients of the private polynomial in parallel using a first set of multiplier circuits; and performing the cryptographic key operation based at least in part on results of multiplication of the public polynomial by the private polynomial.

In Example 17, multiplication of the public polynomial by the private polynomial is a part of a lattice key encapsulation mechanism (KEM) operation.

In Example 18, multiplying the public polynomial by the private polynomial further includes performing a modulus reduction of a product of each multiplication of the first coefficient of the public polynomial by all of the plurality of coefficients of the private polynomial, wherein the modulus reduction is to be performed in a same clock cycle as each multiplication.

In Example 19, multiplying the public polynomial by the private polynomial further includes multiplying a second coefficient of the public polynomial by all of the plurality of coefficients of the private polynomial in parallel using a second set of multiplier circuits, multiplication of the second coefficient of the public polynomial being performed in parallel with multiplication of the first coefficient of the public polynomial.

In Example 20 the method further includes performing one or more additions utilizing one or more sets of adder circuits, the additions being additions of products of one or both of multiplication of the first coefficient of the public polynomial by all of the plurality of coefficients of the private polynomial and multiplication of the second coefficient of the public polynomial by all of the plurality of coefficients of the private polynomial.

In Example 21, an apparatus includes means for receiving a request for a cryptographic key operation, the operation including multiplication of a first polynomial by a second polynomial, the first polynomial and the second polynomial each including a plurality of coefficients; means for selecting a first coefficient of the first polynomial for processing; means for multiplying the first coefficient of the first polynomial by all of the plurality of coefficients of the second polynomial in parallel; and means for performing the cryptographic key operation based at least in part on results of multiplication of the first polynomial by the second polynomial.

In Example 22, apparatus further includes means for iteratively multiplying each of the plurality of coefficients of the first polynomial with all of the plurality of coefficients of the second polynomial in parallel.

In Example 23, the first polynomial is a public polynomial and the second polynomial is a private polynomial.

In Example 24, multiplication of the first polynomial by the second polynomial is a part of a lattice key encapsulation mechanism (KEM) operation.

In Example 25, the apparatus further includes means for performing a modulus reduction of a product of each multiplication of the first coefficient of the first polynomial by all of the plurality of coefficients of the second polynomial, wherein the modulus reduction is to be performed in a same clock cycle as each multiplication.

In Example 26, the apparatus further includes means for selecting a second coefficient of the first polynomial for processing together with the first coefficient of the first polynomial; and multiplying the second coefficient of the first polynomial by all of the plurality of coefficients of the second polynomial in parallel, multiplication of the second coefficient of the first polynomial being performed in parallel with multiplication of the first coefficient of the first polynomial.

In Example 27, the apparatus further includes means for performing one or more additions using products of one or both of multiplication of the first coefficient of the first polynomial by all of the plurality of coefficients of the second polynomial and multiplication of the second coefficient of the first polynomial by all of the plurality of coefficients of the second polynomial.

In Example 28, a system includes one or more processors to process data; a memory for storage of data; and polynomial multiplier circuitry to multiply a first polynomial by a second polynomial, wherein the first polynomial is a public polynomial and the second polynomial is a private polynomial, the first polynomial and the second polynomial each including a plurality of coefficients, the polynomial multiplier circuitry including a set of multiplier circuits, wherein the polynomial multiplier circuitry is to: select a first coefficient of the first polynomial for processing; and multiply the first coefficient of the first polynomial by all of the plurality of coefficients of the second polynomial in parallel using the set of multiplier circuits.

In Example 29, the polynomial multiplier circuitry is to iteratively multiply each of the plurality of coefficients of the first polynomial with all of the plurality of coefficients of the second polynomial in parallel using the set of multiplier circuits.

In Example 30, the apparatus is to perform a cryptographic key operation based base at least in part on multiplication of the first polynomial by the second polynomial.

In Example 31, the multiplication of the first polynomial by a second polynomial is a part of a lattice key encapsulation mechanism (KEM) operation.

In Example 32, the polynomial multiplier circuitry is further to perform a modulus reduction of a product of each multiplication of the first coefficient of the first polynomial by all of the plurality of coefficients of the second polynomial, and wherein the modulus reduction is to be performed in a same clock cycle as each multiplication.

In Example 33, the polynomial multiplier circuitry includes a second set of multiplier circuits, and wherein the wherein the polynomial multiplier circuitry is further to: select a second coefficient of the first polynomial for processing together with the first coefficient of the first polynomial; and multiply the second coefficient of the first polynomial by all of the plurality of coefficients of the second polynomial in parallel using the set of multiplier circuits, multiplication of the second coefficient of the first polynomial being performed in parallel with multiplication of the first coefficient of the first polynomial.

In Example 34, the polynomial multiplier circuitry includes one or more sets of adder circuits, and wherein the polynomial multiplier circuitry is further to: perform one or more additions using products of one or both of multiplication of the first coefficient of the first polynomial by all of the plurality of coefficients of the second polynomial and multiplication of the second coefficient of the first polynomial by all of the plurality of coefficients of the second polynomial.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The foregoing description and drawings are to be regarded in an illustrative rather than a restrictive sense.

Persons skilled in the art will understand that various modifications and changes may be made to the embodiments described herein without departing from the broader spirit and scope of the features set forth in the appended claims.

What is claimed is:

1. An apparatus comprising:
   one or more processors to process data; and
   polynomial multiplier circuitry, the polynomial multiplier circuitry including one or more sets of multiplier circuits;
   wherein the one or more processors are to perform a cryptographic key operation utilizing the polynomial multiplier circuitry, the cryptographic key operation including processing a first plurality of coefficient values representing a first polynomial and a second plurality of coefficient values representing a second polynomial, wherein the polynomial multiplier circuitry is to:
   select a first set of one or more coefficient values of the first plurality of coefficient values for processing;
   perform a set of multiplication operations to multiply each of the first set of one or more coefficient values by all of the second plurality of coefficient values in parallel using the one or more sets of multiplier circuits; and
   iteratively perform sets of multiplication operations to multiply additional sets of one or more coefficient values of the first set of coefficient values with all of the second plurality of coefficient values in parallel using the one or more sets of multiplier circuits until all of the first plurality of coefficient values are processed.

2. The apparatus of claim 1, wherein the first polynomial is a public polynomial and the second polynomial is a private polynomial.

3. The apparatus of claim 1, wherein the cryptographic key operation includes a lattice key encapsulation mechanism (KEM) operation.

4. The apparatus of claim 1, wherein the polynomial multiplier circuitry is further to perform a modulus reduction of a product of each multiplication of the first set of one or more coefficient values by all of the second plurality of coefficient values, and wherein the modulus reduction is to be performed in a same clock cycle as each multiplication.

5. The apparatus of claim 1, wherein the one or more sets of polynomial multiplier circuitry includes at least a first set of multiplier circuits and a second set of multiplier circuits;
   wherein selecting a first set of one or more coefficient values includes selecting a first coefficient value and a second coefficient value of the first plurality of coefficient values; and
   wherein performing the set of multiplication operations includes performing multiplication operations to multiply the first coefficient value by all of the second plurality of coefficient values in parallel using the first set of multiplier circuits, and performing multiplication operations to multiply the second coefficient value by all of the second plurality of coefficient values in parallel using the second set of multiplier circuits, the multiplication operations for the second coefficient value being performed in parallel with the multiplication operations for the first coefficient value.

6. The apparatus of claim 1, wherein the polynomial multiplier circuitry further includes one or more sets of adder circuits, and wherein performance of the cryptographic key operation includes the polynomial multiplier circuitry further to:
   perform a set of one or more addition operations utilizing the one or more sets of adder circuits, the one or more addition operations using products of the multiplication of the first set of one or more coefficient values by all of the second plurality of coefficient values.

7. The apparatus of claim 1, wherein a number of multiplier circuits in the one or more sets of multiplier circuits is equal to at least a number of coefficient values in the second plurality of coefficient values.

8. One or more non-transitory computer-readable storage mediums having stored thereon executable computer program instructions that, when executed by one or more processors, cause the one or more processors to perform operations comprising:
   receiving a request for a cryptographic key operation utilizing polynomial multiplier circuitry including one or more sets of multiplier circuits, the cryptographic key operation including processing a first plurality of coefficient values representing a first polynomial and a second plurality of coefficient values representing a second polynomial, wherein the cryptographic key operation includes:
   selecting a first set of one or more coefficient values of the first plurality of coefficient values for processing;
   performing a set of multiplication operations to multiply each of the first set of one or more coefficient values by all of the second plurality of coefficient values in parallel using the one or more sets of multiplier circuits; and
   iteratively performing sets of multiplication operations to multiply additional sets of one or more coefficient values of the first set of coefficient values with all of the second plurality of coefficient values in parallel using the one or more sets of multiplier circuits until all of the first plurality of coefficient values are processed.

9. The one or more non-transitory computer-readable storage mediums of claim 8, wherein the first polynomial is a public polynomial and the second polynomial is a private polynomial.

10. The one or more non-transitory computer-readable storage mediums of claim 9, the cryptographic key operation includes a lattice key encapsulation mechanism (KEM) operation.

11. The one or more non-transitory computer-readable storage mediums of claim 8, wherein the instructions further include instructions for:
    performing a modulus reduction of a product of each multiplication of the first set of one or more coefficient values by all of the second plurality of coefficient values, wherein the modulus reduction is to be performed in a same clock cycle as each multiplication.

12. The one or more non-transitory computer-readable storage mediums of claim 8, wherein the one or more sets of polynomial multiplier circuitry includes at least a first set of multiplier circuits and a second set of multiplier circuits;
    wherein selecting a first set of one or more coefficient values includes selecting a first coefficient value and a second coefficient value of the first plurality of coefficient values; and
    wherein performing the set of multiplication operations includes performing multiplication operations to multiply the first coefficient value by all of the second plurality of coefficient values in parallel using the first set of multiplier circuits, and performing multiplication operations to multiply the second coefficient value by all of the second plurality of coefficient values in parallel using the second set of multiplier circuits, the multiplication operations for the second coefficient value being performed in parallel with the multiplication operations for the first coefficient value.

13. The one or more non-transitory computer-readable storage mediums of claim 12, wherein the polynomial multiplier circuitry further includes one or more sets of adder circuits, and wherein the performance of the cryptographic key operation further include instructions for:

performing a set of one or more addition operations utilizing the one or more sets of adder circuits, the one or more addition operations using products of the multiplication of the first set of one or more coefficient values by all of the second plurality of coefficient values.

14. A method comprising:

receiving a request for a cryptographic key operation in a computing system utilizing polynomial multiplier circuitry including one or more sets of multiplier circuits, the cryptographic key operation including processing a first plurality of coefficient values representing a first polynomial and a second plurality of coefficient values representing a second polynomial:

providing side-channel protection for the cryptographic key operation in the computing system, including:

selecting a first set of one or more coefficient values of the first plurality of coefficient values for processing;

performing a set of multiplication operations to multiply each of the first set of one or more coefficient values by all of the second plurality of coefficient values in parallel using the one or more sets of multiplier circuits; and iteratively performing sets of multiplication operations to multiply additional sets of one or more coefficient values of the first set of coefficient values with all of the second plurality of coefficient values in parallel using the one or more sets of multiplier circuits until all of the first plurality of coefficient values are processed.

15. The method of claim 14, wherein the cryptographic key operation includes a lattice key encapsulation mechanism (KEM) operation.

16. The method of claim 14, further comprising:

performing a modulus reduction of a product of each multiplication of the first set of one or more coefficient values by all of the second plurality of coefficient values, wherein the modulus reduction is to be performed in a same clock cycle as each multiplication.

17. The method of claim 14, wherein the one or more sets of polynomial multiplier circuitry includes at least a first set of multiplier circuits and a second set of multiplier circuits;

wherein performing the set of multiplication operations includes performing multiplication operations to multiply the first coefficient value by all of the second plurality of coefficient values in parallel using the first set of multiplier circuits, and performing multiplication operations to multiply a second coefficient value by all of the second plurality of coefficient values in parallel using the second set of multiplier circuits, the multiplication operations for the second coefficient value being performed in parallel with the multiplication operations for the first coefficient value.

18. The method of claim 17, wherein the polynomial multiplier circuitry further includes one or more sets of adder circuits, and further comprising:

performing a set one or more operations utilizing the one or more sets of adder circuits, the one or more addition operations using products of the multiplication of the first set of one or more coefficient values by all of the second plurality of coefficient value.

19. The method of claim 14, wherein the first polynomial is a public polynomial and the second polynomial is a private polynomial.

* * * * *